United States Patent
Ahn et al.

(10) Patent No.: US 11,148,121 B2
(45) Date of Patent: Oct. 19, 2021

(54) METHOD OF DEPLETING A VOLATILE COMPONENT IN A MIXTURE USING A SORBENT CROSSLINKED ELASTOMER AND APPARATUS FOR PRACTICING THE METHOD

(71) Applicant: Dow Silicones Corporation, Midland, MI (US)

(72) Inventors: Dongchan Ahn, Midland, MI (US); Aaron Greiner, Midland, MI (US); James Thompson, Sanford, MI (US)

(73) Assignee: Dow Silicones Corporation, Midland, MI (US)

( * ) Notice: Subject to any disclaimer, the term of this patent is extended or adjusted under 35 U.S.C. 154(b) by 510 days.

(21) Appl. No.: 16/081,314

(22) PCT Filed: Apr. 17, 2017

(86) PCT No.: PCT/US2017/027854
§ 371 (c)(1),
(2) Date: Aug. 30, 2018

(87) PCT Pub. No.: WO2017/209846
PCT Pub. Date: Dec. 7, 2017

(65) Prior Publication Data
US 2019/0076820 A1    Mar. 14, 2019

Related U.S. Application Data

(60) Provisional application No. 62/343,254, filed on May 31, 2016.

(51) Int. Cl.
*B01D 53/02* (2006.01)
*B01J 20/34* (2006.01)
(Continued)

(52) U.S. Cl.
CPC .......... *B01J 20/3425* (2013.01); *B01D 53/02* (2013.01); *B01D 53/0407* (2013.01);
(Continued)

(58) Field of Classification Search
CPC ........ B01D 2253/202; B01D 2257/302; B01D 2257/304; B01D 2257/306;
(Continued)

(56) References Cited

U.S. PATENT DOCUMENTS 3,159,601 A   12/1964   Ashby
3,220,972 A   11/1965   Lamoreaux
(Continued)

FOREIGN PATENT DOCUMENTS

DE    3802543    8/1989
EP    0347895    11/1993
JP    2009061449   3/2009

OTHER PUBLICATIONS

Translation of DE 3802543; Wacker Chemie GMBH (Year: 1989).*
(Continued)

*Primary Examiner* — Christopher P Jones (57) ABSTRACT

A method and apparatus for removing a volatile component from a mixture are disclosed. The method and apparatus employ a crosslinked elastomer with a glass transition temperature $\leq +25°$ C. as the sorbent.

7 Claims, 1 Drawing Sheet

(51) Int. Cl.
*B01J 20/26* (2006.01)
*C02F 1/28* (2006.01)
*B01D 53/04* (2006.01)
*B01J 20/22* (2006.01)
*B01D 53/047* (2006.01)
*C02F 101/32* (2006.01)

(52) U.S. Cl.
CPC ....... *B01D 53/047* (2013.01); *B01D 53/0423* (2013.01); *B01D 53/0454* (2013.01); *B01D 53/0462* (2013.01); *B01J 20/223* (2013.01); *B01J 20/262* (2013.01); *B01J 20/267* (2013.01); *B01J 20/3458* (2013.01); *B01J 20/3475* (2013.01); *B01J 20/3491* (2013.01); *C02F 1/285* (2013.01); *B01D 2253/202* (2013.01); *B01D 2257/302* (2013.01); *B01D 2257/304* (2013.01); *B01D 2257/306* (2013.01); *B01D 2257/404* (2013.01); *B01D 2257/504* (2013.01); *B01D 2257/556* (2013.01); *B01D 2257/702* (2013.01); *B01D 2257/706* (2013.01); *B01D 2257/708* (2013.01); *B01D 2257/80* (2013.01); *C02F 2101/322* (2013.01); *C02F 2303/16* (2013.01); *Y02C 20/40* (2020.08)

(58) Field of Classification Search
CPC ........ B01D 2257/404; B01D 2257/504; B01D 2257/556; B01D 2257/702; B01D 2257/706; B01D 2257/708; B01D 2257/80; B01D 53/02; B01D 53/0407; B01D 53/0423; B01D 53/0454; B01D 53/0462; B01D 53/047; B01J 20/223; B01J 20/262; B01J 20/267; B01J 20/3425; B01J 20/3458; B01J 20/3475; B01J 20/3491; C02F 1/285; C02F 2303/16; B02F 2101/322; Y02C 10/08
See application file for complete search history.

(56) References Cited

U.S. PATENT DOCUMENTS

| | | |
|---|---|---|
| 3,296,291 A | 1/1967 | Chalk et al. |
| 3,419,593 A | 12/1968 | Willing |
| 3,516,946 A | 6/1970 | Modic |
| 3,814,730 A | 6/1974 | Karstedt |
| 3,989,668 A | 11/1976 | Lee et al. |
| 4,766,176 A | 8/1988 | Lee et al. |
| 4,784,879 A | 11/1988 | Lee et al. |
| 5,017,654 A | 5/1991 | Togashi et al. |
| 5,036,117 A | 7/1991 | Chung et al. |
| 5,175,325 A | 12/1992 | Brown et al. |
| 5,466,767 A | 11/1995 | Wieland et al. |
| 5,472,613 A | 12/1995 | Schofield |
| 5,922,108 A | 7/1999 | Lehmann et al. |
| 2008/0202336 A1 | 8/2008 | Hofer et al. |

OTHER PUBLICATIONS

Jelinek, Activated silicone rubber as a sorbent for solid phase extraction of volatiles from aqueous solutions, Chemical Papers (1994), 48(4), 229-235.
Search report from corresponding Japan application 2018-559307, dated Oct. 28, 2019.
Search report from corresponding China application 201780029629.0, dated Oct. 7, 2020.

* cited by examiner

METHOD OF DEPLETING A VOLATILE COMPONENT IN A MIXTURE USING A SORBENT CROSSLINKED ELASTOMER AND APPARATUS FOR PRACTICING THE METHOD

CROSS REFERENCE TO RELATED APPLICATIONS

This application is a U.S. national stage filing under 35 U.S.C. § 371 of PCT Application No. PCT/US2017/027854 filed on 17 Apr. 2017, which claims the benefit of U.S. Provisional Patent Application No. 62/343,254 filed 31 May 2016 under 35 U.S.C. § 119 (e). PCT Application No. PCT/US2017/027854 and U.S. Provisional Patent Application No. 62/343,254 are hereby incorporated by reference.

BACKGROUND

Reduction of volatile species such as volatile polydiorganosiloxanes (e.g., cyclic polydialkylsiloxanes and/or linear polydialkylsiloxanes) and/or volatile organic compounds (VOC's) is often a cost-prohibitive step in chemical manufacturing, as well as in the treatment of effluent process gas or wastewater streams. Porous solid adsorbents such as activated carbon or molecular sieves have been used for such purposes. However because such solid adsorbents rely upon adsorption into pores, they may suffer from the drawbacks of being subject to mass transfer limitations, requiring significant energy input for regeneration by desorption, and/or being prone to fouling and capillary condensation.

Silicone liquids have also been used for volatile species removal because they may be more readily regenerated, feature faster dynamics and/or are less prone to fouling than porous solid adsorbents. However, existing methods using silicone liquids in which the feed mixture to be treated is directly contacted with the silicone liquid may require additional liquid separation steps if any of the silicone liquid is entrained or carried over into the feed mixture or vice versa. To avoid such problems, methods employing membrane separators have been used. However, membrane separators suffer from the drawbacks that they may add equipment cost and be prone to fouling.

Problem to be Solved

There is an industry need for methods to remove volatile polyorganosiloxanes and/or VOC's from products, effluent process gas and/or wastewater streams, where such methods and apparatus can be readily regenerated, are less prone to fouling, and/or have fewer mass transfer limitations than existing methods and apparatus.

BRIEF SUMMARY OF THE INVENTION

A method for depleting a volatile component in a mixture comprises sorbing at least some of the volatile component into bulk of a nonporous crosslinked elastomer with a glass transition temperature ≤25° C., thereby enriching the nonporous crosslinked elastomer in the volatile component and depleting the mixture in the volatile component.

DETAILED DESCRIPTION OF THE INVENTION

Method Steps

A method for depleting a volatile component in a mixture comprising the volatile component and at least one other component forms a depleted mixture, which contains less of the volatile component than the mixture before practicing the method. The method comprises:

1) sorbing at least some of the volatile component into bulk of a nonporous crosslinked elastomer with a glass transition temperature ≤25° C., thereby forming the depleted mixture and enriching the nonporous crosslinked elastomer with sorbed volatile component thereby forming an enriched crosslinked elastomer, wherein during step 1), at least some of the volatile component is in gas phase, 2) desorbing at least some of the volatile component from the enriched crosslinked elastomer, thereby forming a desorbed volatile component and a regenerated elastomer, 3) using the regenerated elastomer as all or a portion of the nonporous crosslinked elastomer in repeating step 1), and 4) directing to a desired location one or both of the depleted mixture after step 1) and the desorbed volatile component after step 2).

In step 1) of the method, method conditions (such as pressure and temperature) are such that at least some of the volatile component is in the gas phase. The conditions may be such that the mixture is heated. The temperature for heating may be above the boiling point of the volatile component. Alternatively, the temperature is selected such that at least some (alternatively, all) of the volatile component is in the gas phase. Alternatively, the method may further comprise vaporizing the mixture before step 1). The mixture may be vaporized by any convenient means such as heating e.g., above the boiling temperature of the mixture. Without wishing to be bound by theory, it is thought that as long as the partial pressure of the volatile component in the mixture exceeds the partial pressure of the volatile component in the nonporous crosslinked elastomer, there will be a sufficient driving force for mass transfer of the volatile component into the bulk of the nonporous crosslinked elastomer.

The mixture may be contacted with the nonporous crosslinked elastomer with a glass transition temperature of ≤25° C. ("Elastomer") for an amount of time sufficient to allow the Elastomer to sorb at least some of the volatile component from the mixture into the bulk of the Elastomer. The mixture may be contacted directly with the Elastomer in step 1), i.e., without the use of a membrane. The mixture may be a liquid, wherein at least some of the volatile component is in the gas phase. Alternatively, the mixture may be in the gas phase during step 1).

Step 2) of the method may be performed to regenerate the Elastomer. As the Elastomer sorbs the volatile component, sorption rate may decrease and/or the Elastomer may swell. It is desirable to desorb at least some of the volatile component from the bulk of the Elastomer so that the Elastomer can be regenerated and reused. During and/or after step 2), the volatile component may optionally be recovered. Regenerating the Elastomer may be performed by stopping step 1) of the method and regenerating the Elastomer, then repeating step 1) after step 2). Alternatively, the mixture may be re-routed to continue step 1) while performing step 2) on the enriched crosslinked elastomer. An example of this method is shown below in FIG. 1.

Regenerating the enriched crosslinked elastomer may be performed by any convenient means, such as heating, optionally with sweeping by a dry air gas stream or inert gas stream in contact with the enriched crosslinked elastomer. It is also possible to desorb at lower temperature (e.g., room temperature of 25° C. or less) by exposing the enriched crosslinked elastomer to a reduced pressure (e.g., less than atmospheric pressure), and/or contacting the enriched crosslinked elastomer with a volatile component depleted sweep stream. Alternatively, exposing the enriched crosslinked elastomer to solvent with or without swelling the enriched crosslinked elastomer may also be used to regenerate the enriched crosslinked elastomer. Alternatively, liquid extraction, e.g., solvent or supercritical fluid extraction may be used to regenerate the enriched crosslinked elastomer. The method further comprises step 3), in which the regenerated elastomer may be reused to repeat step 1). The nonporous crosslinked elastomer used in repeating step 1) may be all regenerated elastomer, alternatively, a portion of the nonporous crosslinked elastomer used to repeat step 1) may be regenerated elastomer, with the balance being fresh nonporous crosslinked elastomer.

The method further comprises directing to a desired location one or both of the depleted mixture during and/or after step 1) and the desorbed volatile component during and/or after step 2). Directing may be performed by any convenient means such as feeding the depleted mixture through a channel such as a pipe, duct, or other conduit to the desired location, such as a recovery operation. The recovery operation may include cooling apparatus, such as a heat exchanger or condenser. The recovery operation may include a collection apparatus such as a tank, reservoir, or other container, for storing the depleted mixture and/or a tank for storing the volatile component. Alternatively, the depleted mixture may be directed to a different operation, such as when the depleted mixture will be used as a reactant. Alternatively, the volatile component may be directed to a different operation, such as when the volatile component will be used as a reactant. Alternatively, one or both of the depleted mixture and the volatile contaminant may be directed to collection containers.

For example, when the method is being used to purify the mixture of the volatile component. The depleted mixture is a purified mixture that may be recovered and/or directed by any convenient means, such as feeding the depleted mixture through a channel such as a pipe, duct, or other conduit to a heat exchanger or condenser and cooling therein, when the mixture is heated and/or in the gas phase.

Alternatively, recovering the purified mixture may comprise feeding the purified mixture from the condenser (described above) to a different reactor where the purified mixture is used as a reactant or solvent. Alternatively, when the purified mixture comprises a polyorganosiloxane (free of a cyclic polyorganosiloxane volatile contaminant), the purified mixture may be directed to a collection container to be tested, packaged and/or sold, or the purified mixture may be directed to a different process and used as a reactant or other ingredient in making a polyorganosiloxane containing product.

Alternatively, when the mixture is waste water and the depleted mixture is purified water, the purified water may be directed by feeding (e.g., pumping) the purified water to a process to test, or to the environment. Alternatively, when the mixture is air, and the depleted mixture is purified air (such as dehumidified air), the purified air may be directed blowing or pumping via ductwork into an air handling system or a ventilation system. It is understood that conduit through which the one or both of the depleted mixture during and/or after step 1) and the desorbed volatile component during and/or after step 2) is directed may also contain in-line monitoring testing equipment, such as gauges, meters and sensors, along with conveying equipment such as pumps, fans, blowers, extruders, compounders, and valves.

The volatile component may be recovered by any convenient means. For example, when the enriched crosslinked elastomer is regenerated by sweeping with a dry gas stream, as described above, the gas stream containing the volatile component may be directed through a condenser to recover the volatile component. Alternatively, if a solvent is used to regenerate the enriched crosslinked elastomer, the volatile component may be directed to an apparatus for stripping, extracting, or distilling the solvent. Alternatively, directing the volatile component may comprise feeding the volatile component from the condenser (described above), or the solvent containing the volatile component, to a different reactor where the volatile component is used as a reactant.

Volatile Component

The volatile component may be any species that is desirably removed from the mixture. The In the method described herein, the volatile component may have a vapor pressure of 0.1 mmHg at 70° C. to 760 mmHg at 70° C., alternatively 1 mmHg at 70° C. to 100 mmHg at 70° C., alternatively 4 mmHg at 70° C. to 82 mmg, and alternatively 17 mmHg at 70° C. to 82 mmHg at 70° C. The product formed by step 1) of the method is a depleted mixture, wherein said depleted mixture is free of the volatile component, or contains less of the volatile component than the mixture before step 1). "Free of" means that the depleted mixture contains none of the volatile component or an amount of the volatile component that is non-detectable by GC analysis.

The volatile component may be a cyclic polyorganosiloxane with a degree of polymerization ("DP") from 3 to 12, alternatively the volatile component may be a cyclic polydialkylsiloxane with an average DP of 4. The cyclic polyorganosiloxane may be have formula $(R^{11}R^{12}SiO_{2/2})_k$, where subscript k is 3 to 12, each $R^{11}$ is independently a monovalent hydrocarbon group or monovalent halogenated hydrocarbon group, and each $R^{12}$ is independently $R^{11}$, OH, or H. Suitable monovalent hydrocarbon groups include alkyl, alkenyl, alkynyl, aryl, aralkyl, and carbocyclic groups. Alkyl groups include branched or unbranched, saturated monovalent hydrocarbon groups, which are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbon groups of 6 or more carbon atoms. An alkenyl group is a monovalent hydrocarbon group containing a double bond. Suitable alkenyl groups for $R^{11}$ are exemplified by, but not limited to, ethenyl, propenyl (e.g., iso-propenyl and/or n-propenyl), butenyl (e.g., isobutenyl, n-butenyl, tert-butenyl, and/or sec-butenyl), pentenyl (e.g., isopentenyl, n-pentenyl, and/or tert-pentenyl), hexenyl, heptenyl, octenyl, nonenyl, and decenyl, as well as such branched groups of 6 or more carbon atoms. An alkynyl group is a monovalent hydrocarbon group containing a triple bond. Suitable alkynyl groups for $R^{11}$ are exemplified by, but not limited to, ethynyl, propynyl (e.g., iso-propynyl and/or n-propynyl), butynyl (e.g., isobutynyl, n-butynyl, tert-butynyl, and/or sec-butynyl), pentynyl (e.g., isopentynyl, n-pentynyl, and/or tert-pentynyl), hexynyl, heptynyl, octynyl, nonynyl, and decynyl, as well as such branched groups of 6 or more carbon atoms. Aryl groups include cyclic, fully unsaturated, hydrocarbon groups exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Aralkyl group means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl. Carbocyclic groups are hydrocarbon rings. Carbocyclic groups may be monocyclic or alternatively may have fused, bridged, or spiro polycyclic rings. Monocyclic carbocyclic groups may have 3 to 9 carbon atoms, alternatively 4 to 7 carbon atoms, and alternatively 5 to 6 carbon atoms. Polycyclic carbocyclic groups may have 7 to 17 carbon atoms, alternatively 7 to 14 carbon atoms, and alternatively 9 to 10 carbon atoms. Carbocycles may be saturated or partially unsaturated. The carbocyclic group may be a cycloalkyl group, which is saturated. Suitable monocyclic cycloalkyl groups are exemplified by cyclobutyl, cyclopentyl, and cyclohexyl. Suitable monovalent halogenated hydrocarbon groups refer to a monovalent hydrocarbon group where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include chloroallyl. Alternatively, the volatile component may be a cyclic polydiorganohydrogensiloxane. The volatile component may comprise (i) hexamethylcyclotrisiloxane ($D_3$), (ii) octamethylcyclotetrasiloxane ($D_4$), (iii) tetramethylcyclotetrasiloxane ($D_4^H$), (iv) tetramethyltetravinyl cyclotetrasiloxane ($D_4^{Vi}$), (v) tetramethyltetraphenylcyclotetrasiloxane ($D_4^{Ph}$), (vi) decamethylcyclopentasiloxane ($D_5$), (vii) pentamethylcyclopentasiloxane ($D_5^H$), (viii) pentamethylpentavinylcyclopentasiloxane ($D_5^{Vi}$), (ix) pentamethylpentaphenylcyclopentasiloxane ($D_5^{Ph}$), (x) dodecamethylcyclohexasiloxane ($D_6$), (xi) hexamethylcyclohexasiloxane ($D_6^H$), (xii) hexamethylhexavinylcyclohexasiloxane ($D_6^{Vi}$), (xiii) hexamethylhexaphenylcyclohexasiloxane ($D_6^{Ph}$), or (xiv) combinations of two or more of (i), (ii), (iii), (iv), (v), (vi), (vii), (viii), (ix), (x), (xi), (xii), and (xiii). Alternatively, the volatile component may be selected from $D_3$, $D_4$, $D_5$, $D_6$, and combinations of two or more of $D_3$, $D_4$, $D_5$, and $D_6$. Alternatively, the volatile component may be $D_4$.

Alternatively, the volatile component may be an organosilane or polyorganosiloxane with a DP of 1 to 14. The organosilane may have formula: $R^1{}_v SiR^2{}_{(4-v)}$, where each $R^1$ is independently a monovalent hydrocarbon group or a monovalent halogenated hydrocarbon group, each $R^2$ is independently a hydrogen atom, a halogen atom, a hydrocarbonoxy group such as alkoxy, an amino functional group, an acyloxy group such as acetoxy, an epoxy-functional group, a methacrylate functional group, an oximo functional group such as ketoxime, an acrylate functional group, a polyol functional group such as polyether, a thiol functional group; and subscript v is 0 to 4, alternatively 0 to 3.

Suitable monovalent hydrocarbon groups for $R^1$ include alkyl, alkenyl, alkynyl, aryl, aralkyl, and carbocyclic groups. Alkyl groups include branched or unbranched, saturated monovalent hydrocarbon groups, which are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbon groups of 6 or more carbon atoms. An alkenyl group is a monovalent hydrocarbon group containing a double bond. Suitable alkenyl groups for $R^1$ are exemplified by, but not limited to, ethenyl, propenyl (e.g., iso-propenyl and/or n-propenyl), butenyl (e.g., isobutenyl, n-butenyl, tert-butenyl, and/or sec-butenyl), pentenyl (e.g., isopentenyl, n-pentenyl, and/or tert-pentenyl), hexenyl, heptenyl, octenyl, nonenyl, and decenyl, as well as such branched groups of 6 or more carbon atoms. An alkynyl group is a monovalent hydrocarbon group containing a triple bond. Suitable alkynyl groups for $R^1$ are exemplified by, but not limited to, ethynyl, propynyl (e.g., iso-propynyl and/or n-propynyl), butynyl (e.g., isobutynyl, n-butynyl, tert-butynyl, and/or sec-butynyl), pentynyl (e.g., isopentynyl, n-pentynyl, and/or tert-pentynyl), hexynyl, heptynyl, octynyl, nonynyl, and decynyl, as well as such branched groups of 6 or more carbon atoms. Aryl groups include cyclic, fully unsaturated, hydrocarbon groups exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Aralkyl group means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl. Carbocyclic groups are hydrocarbon rings. Carbocyclic groups may be monocyclic or alternatively may have fused, bridged, or spiro polycyclic rings. Monocyclic carbocyclic groups may have 3 to 9 carbon atoms, alternatively 4 to 7 carbon atoms, and alternatively 5 to 6 carbon atoms. Polycyclic carbocyclic groups may have 7 to 17 carbon atoms, alternatively 7 to 14 carbon atoms, and alternatively 9 to 10 carbon atoms. Carbocycles may be saturated or partially unsaturated. The carbocyclic group may be a cycloalkyl group, which is saturated. Suitable monocyclic cycloalkyl groups are exemplified by cyclobutyl, cyclopentyl, and cyclohexyl. Suitable monovalent halogenated hydrocarbon groups refer to a monovalent hydrocarbon group where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include chloroallyl.

Suitable halogen atoms for $R^2$ include F, Cl, Br, or I; alternatively F, Cl, or Br; alternatively Cl or Br; alternatively Cl; alternatively Br. Suitable hydrocarbonoxy groups for $R^2$ have formula $OR^3$, where $R^3$ is a monovalent hydrocarbon group as defined above for $R^1$. Subscript v is 1 to 4, alternatively 1 to 3, and alternatively 1 to 2. Exemplary organosilanes include trimethylsilane, vinyltrimethylsilane, allyltrimethylsilane, dimethyldimethoxysilane, and/or methyltrimethoxysilane.

The volatile polyorganosiloxane may be linear or branched. Examples include polydimethylsiloxane oligomers and polymers. The volatile polyorganosiloxane may have unit formula $(R^4_3SiO_{1/2})_w(R^4_2SiO_{2/2})_x(R^4SiO_{3/2})_y(SiO_{4/2})_z$, where $R^4$ is a hydrogen atom, OH, or $R^1$ as described above, subscript w is >0, subscript x≥0, subscript y is ≥0, subscript z is ≥0, with the proviso that a quantity (w+x+y+z) is ≤14. Alternatively, y may be 0. Alternatively, z may be 0. Alternatively, w may be 2 and x may be 0 to 12, alternatively 0 to 2. Exemplary volatile polyorganosiloxanes may include those of formulae: $(R^4_3SiO_{1/2})_2(R^4_2SiO_{2/2})_2$, $(R^4_3SiO_{1/2})_2(R^4_2SiO_{2/2})_1$, $(R^4_3SiO_{1/2})_2$, and/or $(R^4_3SiO_{1/2})_4(SiO_{4/2})_1$. Alternatively, each $R^4$ may be independently a hydrogen atom, a methyl group, a vinyl group, or a phenyl group. Alternatively, each $R^4$ may be methyl. Such volatile polyorganosiloxanes include hexamethyldisiloxane, octamethyltrisiloxane, hexamethylcyclotrisiloxane, and other low molecular weight polyorganosiloxanes, such as 0.5 to 1.5 cSt Dow Corning® 200 Fluids and Dow Corning® OS FLUIDS, which are commercially available from Dow Corning Corporation of Midland, Mich., U.S.A.

Alternatively, the volatile component may be a volatile organic compound (VOC). The VOC may be (i) an aldehyde, such as formaldehyde or acetaldehyde, (ii) an aromatic compound, (iii) an alkane or cycloalkane, (iv) an alkene, (v) an alkyne, or a combination of two or more of (i), (ii), (iii), (iv), and (v). Examples of aromatic compounds include aromatic hydrocarbons such as toluene, benzene, and/or xylene. Examples of alkanes include methane, ethane, propane, butane pentane, hexanes, heptanes, octane, and/or isomers thereof, cyclohexane, and/or combinations thereof. Examples of alkenes include ethylene, propene, butene, pentene and/or isomers thereof and/or combinations thereof.

Alternatively, VOC may be an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an ether such as diethyl ether a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride; chloroform; dimethyl sulfoxide; dimethyl formamide, acetonitrile; tetrahydrofuran; white spirits; mineral spirits; naphtha; n-methyl pyrrolidone; halogenated volatile organic compounds, such as halogenated hydrocarbons, e.g., chloroflurocarbons such as Freon, or a combination of two or more thereof.

Alternatively, the VOC may be an organic monomer used in polymerization or crosslinking such as ethylene, propylene, butene, isobutene, 1,3-butadiene, isoprene, vinyl chloride, vinyl acetate, vinyl fluoride, styrene, acrylonitrile, ethylene oxide, propylene oxide, acrylate and methacrylate monomers such as acrylic acid, methacrylic acid, methyl acrylate, methyl methacrylate, butyl acrylate, 2-ethylhexyl acrylate, cyanoacrylates, isobornyl acrylate, tetrafluoroethylene, glycidyl methacrylate, tetrahydrofurfuryl methacrylate, isocyanates, such as methylene diphenyl diisocyanates, toluene diisocyanate, phosgene, amine compounds such as ethylene diamine, epoxy compounds such as an oligomeric liquid epoxy resin. The VOC may also be a petroleum-derived fuel or fuel mixture, such as diesel fuel, jet fuel or gasoline. Alternatively, the VOC may be an organic noxious or odor causing compound such as organosulfur compound. Alternatively, the volatile component may be $CO_2$.

Alternatively, the volatile component may be an inorganic compound. For example, the volatile component may be water vapor when the method described herein is used for drying the mixture. Alternatively, the inorganic compound may be (i) a chloramine, (ii) $H_2S$, (iii) $SO_x$, (iv) $NO_x$, and combinations of two or more of (i), (ii), (iii), and (iv).

Mixture

The mixture may be any mixture from which it is desirable to remove some or all of a volatile component as described above. The mixture comprises the volatile component and at least one other component. The volatile component may have a vapor pressure less than a vapor pressure of the at least one other component in the mixture. In certain embodiments, the volatile component may be distinguished from the at least one other component in the mixture by virtue of relative vapor pressures or differences in solubility of the volatile component and solubility of the at least one other component, in the nonporous crosslinked elastomer. For example, in one embodiment, a species such as a linear polydimethylsiloxane may be a volatile component when the other component in the mixture has a lower vapor pressure than the linear polydimethylsiloxane. Alternatively, the same linear polydimethylsiloxane may be the other component in the mixture when the volatile component is, for example, an organic solvent having a vapor pressure higher than the vapor pressure of the linear polydimethylsiloxane. Without wishing to be bound by theory, it is thought that the difference in vapor pressure (where the volatile component has a higher vapor pressure than the at least one other component in the mixture) or differences in solubility of the volatile component, and solubility of the at least one other component in the mixture, in the nonporous crosslinked elastomer allow the vapor phase volatile component to be preferentially removed from the mixture and sorb into the nonporous crosslinked elastomer.

The at least one other component may be a relatively non-volatile polyorganosiloxane (e.g., less volatile than the polyorganosiloxane described above for the volatile component). The non-volatile polyorganosiloxane may have unit formula: $(R^4_3SiO_{1/2})_p(R^4_2SiD_{2/2})_q(R^4SiO_{3/2})_r(SiO_{4/2})_s$, where $R^4$ is as described above, D is an oxygen atom or a divalent hydrocarbon group, subscript p>0, subscript q is >0, subscript r is ≥0, subscript s is ≥0, with the proviso that a quantity (p+q+r+s)>14. Each D is an oxygen atom or a divalent group linking the silicon atom of one unit with another silicon atom in another unit. When D is the divalent linking group, D may be independently selected from divalent hydrocarbon groups containing 2 to 30 carbon atoms, divalent acrylate functional hydrocarbon groups containing 2 to 30 carbon atoms, and/or divalent methacrylate functional hydrocarbon groups containing 2 to 30 carbon atoms. Representative, non-limiting examples of suitable divalent hydrocarbon groups include alkylene groups such as ethylene, propylene (including isopropylene and n-propylene), and butylene (including n-butylene, t-butylene and isobutylene); and pentylene, hexylene, heptylene, octylene, and branched and linear isomers thereof; arylene groups such as phenylene; and alkylaralkylene groups such as:

Representative, non-limiting examples of such divalent organofunctional hydrocarbon groups include divalent bisphenol A derivatives, acrylate-functional alkylene groups and methacrylate-functional alkylene groups. Alternatively, each group D may be ethylene, propylene, butylene or hexylene. Alternatively, each instance of group D may be ethylene or propylene. Non-volatile polyorganosiloxanes are known in the art and are commercially available. Suitable non-volatile polyorganosiloxanes are exemplified by, but not limited to, non-volatile polydimethylsiloxanes. Such non-volatile polydimethylsiloxanes include DOW CORNING® 200 Fluids, which are commercially available from Dow Corning Corporation of Midland, Mich., U.S.A. and may have viscosity ranging from 10 cSt to 100,000 cSt, alternatively 20 cSt to 50,000 cSt, alternatively 50 cSt to 100,000 cSt, alternatively 50 cSt to 50,000 cSt, and alternatively 12,500 to 60,000 cSt. When the method described herein is used to remove a volatile polyorganosiloxane from a non-volatile polyorganosiloxane, then the volatile polyorganosiloxane has a vapor pressure lower than vapor pressure of the non-volatile polyorganosiloxane at the same temperature. The non-volatile polyorganosiloxane and the volatile polyorganosiloxane will differ from one another in at least one property such as molecular weight, degree of polymerization, and selections for $R^4$ groups.

The non-volatile polyorganosiloxane may be a noncyclic polyorganosiloxane polymer and/or copolymer. The method may be used to purify polyorganosiloxane intermediates and products such as linear and/or branched polydiorganosiloxane polymers and/or copolymers. In certain applications, low or non-detectable (by GC) content of cyclic polydialkylsiloxanes is desired by customers, particularly in the beauty and healthcare industries. Examples of such polydiorganosiloxane polymers and copolymers may have formulae (I) or (II), below:

$$R^6{}_3SiO(R^6{}_2SiO)_k(R^6HSiO)_mSiR^6{}_3, \quad \text{Formula (I):}$$

$$R^6{}_2HSiO(R^6{}_2SiO)_n(R^6HSiO)_oSiR^6{}_2H, \text{ or} \quad \text{Formula (II):}$$

a combination thereof.

In formulae (I) and (II) above, subscript k has an average value ranging from 1 to 2000, subscript m has an average value ranging from 0 to 2000, subscript n has an average value ranging from 1 to 2000, and subscript o has an average value ranging from 0 to 2000. Each $R^6$ is independently a monovalent organic group. The monovalent organic group may be a monovalent hydrocarbon group or a monovalent halogenated hydrocarbon group. Monovalent hydrocarbon groups include alkyl, alkenyl, alkynyl, aryl, aralkyl, and carbocyclic groups. Alkyl groups include branched or unbranched, saturated monovalent hydrocarbon groups, which are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbon groups of 6 or more carbon atoms. Aryl groups include cyclic, fully unsaturated, hydrocarbon groups exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Aralkyl group means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl. Carbocyclic groups are hydrocarbon rings. Carbocyclic groups may be monocyclic or alternatively may have fused, bridged, or spiro polycyclic rings. Monocyclic carbocyclic groups may have 3 to 9 carbon atoms, alternatively 4 to 7 carbon atoms, and alternatively 5 to 6 carbon atoms. Polycyclic carbocyclic groups may have 7 to 17 carbon atoms, alternatively 7 to 14 carbon atoms, and alternatively 9 to 10 carbon atoms. Carbocycles may be saturated or partially unsaturated. The carbocyclic group may be a cycloalkyl group, which is saturated. Suitable monocyclic cycloalkyl groups are exemplified by cyclobutyl, cyclopentyl, and cyclohexyl. Suitable monovalent halogenated hydrocarbon groups refer to a monovalent hydrocarbon group where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include chloroallyl.

Alternatively, the monovalent organic group may be a hydrocarbon group substituted with an oxygen-atom, such as, alkoxy groups, aryloxy groups, aralkyloxy groups, oxo (carbonyl) groups, carboxyl groups including carboxylic acids, carboxylates, and carboxylate esters. Alternatively, the monovalent organic group may be a hydrocarbon group substituted with a sulfur atom, such as thiol-functional groups, alkyl and aryl sulfide groups, sulfoxide-functional groups, sulfone functional groups, sulfonyl functional groups, and sulfonamide functional groups. Alternatively, the monovalent organic group may be a hydrocarbon group substituted with a nitrogen atom such as amines, hydroxylamines, nitriles, nitro groups, N-oxides, hydrazides, azides, and enamines. Alternatively, the monovalent organic group may be a hydrocarbon group substituted with another heteroatom-containing groups. Non-limiting examples of atoms and groups substituted on a monovalent hydrocarbon group to form the monovalent organic groups include F, Cl, Br, I, OR', OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$N(R')C(O)R', (CH$_2$)$_{0-2}$N(R')N(R')$_2$, N(R')N(R')C (O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen or a carbon-based moiety, and wherein the carbon-based moiety can itself be further substituted; for example, wherein R' can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl, or R' can be independently mono- or multi-substituted; or wherein two R' groups bonded to a nitrogen atom or to adjacent nitrogen atoms can together with the nitrogen atom or atoms form a heterocyclyl, which can be mono- or independently multi-substituted. Examples of organic groups include linear and/or branched groups such as alkyl groups, fully or partially halogen-substituted haloalkyl groups, alkenyl groups, alkynyl groups, aromatic groups, acrylate functional groups, and methacrylate functional groups; and other organic functional groups such as ether groups, cyanate ester groups, ester groups, carboxylate salt groups, mercapto groups, sulfide groups, azide groups, phosphonate groups, phosphine groups, masked isocyano groups, and hydroxyl groups. Examples of organic groups include, but are not limited to, alkyl groups such as methyl, ethyl, propyl, isopropyl, n-butyl, s-butyl, and t-butyl groups, acrylate functional groups such as acryloyloxypropyl groups and methacryloyloxypropyl groups; alkenyl groups such as vinyl, allyl, and butenyl groups; alkynyl groups such as ethynyl and propynyl groups; aromatic groups such as phenyl, tolyl, and xylyl groups; cyanoalkyl groups such as cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups; alkenyloxypoly(oxyalkyene) groups such as allyloxy(polyoxyethylene), allyloxypoly(oxypropylene), and allyloxy-poly(oxypropylene)-co-poly(oxyethylene) groups; alkyloxypoly(oxyalkyene) groups such as propyloxy(polyoxyethylene), propyloxypoly(oxypropylene), and propyloxy-poly(oxypropylene)-co-poly(oxyethylene) groups; halogen substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; epoxyalkyl groups such as 3-glycidoxypropyl, 2-(3,4,-epoxycyclohexyl)ethyl, and 5,6-epoxyhexyl groups; ester functional groups such as acetoxyethyl and benzoyloxypropyl groups; hydroxy functional groups such as hydroxyethyl and 2-hydroxyethyl groups; masked isocyanate functional groups such as propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; and metal salts of carboxylic acids such as the zinc, sodium, or potassium salts of 3-carboxypropyl and 2-carboxyethyl.

Polyorganosiloxanes in the mixture to be purified are exemplified by:

a) trimethylsiloxy-terminated polydimethylsiloxane,
b) trimethylsiloxy-terminated poly(dimethylsiloxane/methylphenylsiloxane),
c) dimethylhydrogensiloxy-terminated polydimethylsiloxane,
d) dimethylhydrogensiloxy-terminated poly(dimethylsiloxane/methylhydrogensiloxane),
e) dimethylhydrogensiloxy-terminated polymethylhydrogensiloxane,
f) trimethylsiloxy-terminated poly(dimethylsiloxane/methylhydrogensiloxane),
g) trimethylsiloxy-terminated polymethylhydrogensiloxane, hydroxy-terminated polydimethylsiloxane,
hydroxy-terminated poly(dimethylsiloxane/methylvinylsiloxane),
hydroxy-terminated poly(dimethylsiloxane/methylphenylsiloxane),
h) a combination of two or more of a), b), c), d), e), f), and g).

Alternatively, the mixture may be a process gas or vapor stream. Examples include mixed overhead vapor streams from reactors, such as those used to polymerize or functionalize polyorganosiloxanes, as well as air streams and exhaust streams containing residual volatile siloxanes such as landfill gas. Examples of types of reactions include hydrolysis, condensation, hydrosilylation, epoxidation, alkoxylation, trans-esterification, trans-alcoholysis, radical polymerization, anionic or cationic polymerization. Other examples of process gas streams include combustion exhaust from power plants, engines, heaters and furnaces.

Alternatively, the mixture may be a process liquid stream. Examples include VOC-containing wastewater or an emulsion such as a latex paint containing residual monomer or a silicone emulsion containing residual volatile siloxanes.

Applications/Use of the Method

The method may be used in various applications, for example, to dry and/or remove VOCs and/or remove inorganic compounds from process vapor streams.

Alternatively, the method described herein may be used to reduce the amount of cyclic polydiorganosiloxanes (as described above), e.g., polydialkylsiloxanes in mixtures such as non-volatile polyorganosiloxanes (as described above), such as noncyclic polydiorganosiloxanes, process gas effluent, and process wastewater.

In some embodiments, the method described herein may be use to selectively remove a volatile component, while leaving behind a desired volatile component in the depleted mixture. In this embodiment, the solubility of one volatile component in the nonporous crosslinked elastomer may be higher than solubility of a second volatile component having a higher vapor pressure.

For example, in the case of a silicone emulsion, which contains water vapor and cyclic polyorganosiloxanes, such as $D_4$ and $D_5$, it may be desirable to remove the cyclic polyorganosiloxanes and leave water vapor in the emulsion.

In one embodiment, the method described herein may be used to remove a volatile component from a mixture comprising the volatile component and at least one non-volatile component. This method comprises:

1) contacting a vapor phase mixture directly with a nonporous crosslinked elastomer with a glass transition temperature ≤25° C., thereby forming a depleted mixture containing less of the volatile component than the mixture before sorbing and enriching the nonporous crosslinked elastomer with sorbed volatile component thereby forming an enriched crosslinked elastomer, 2) recovering the depleted mixture during and/or after step 1), 3) desorbing at least some of the sorbed volatile component from the enriched crosslinked elastomer, thereby forming a desorbed volatile component and a regenerated elastomer containing less of the sorbed volatile component than the enriched crosslinked elastomer prior to desorbing, 4) using the regenerated elastomer as all or a portion of the nonporous crosslinked elastomer in repeating step 1), and optionally 5) recovering the desorbed volatile component during and/or after step 2). In this embodiment, the volatile component may be a volatile contaminant. The volatile contaminant may comprise a cyclic polyorganosiloxane with a degree of polymerization from 3 to 12 as described above. The at least one non-volatile component in the mixture may comprise a linear polyorganosiloxane. The nonporous crosslinked elastomer may be a nonporous crosslinked polyorganosiloxane elastomer. This embodiment of the method may be used to remove $D_4$ from various mixtures, including but not limited to linear polyorganosiloxanes.

Nonporous Crosslinked Elastomer Having a Tg≤25° C.

The nonporous crosslinked elastomer has a Tg≤+25° C. This may be an organic elastomer or a polyorganosiloxane elastomer. Tg may range from −225° C. to +25° C. Alternatively, Tg may range from −200° C. to +25° C. Examples of organic elastomers suitable for use in the method include polybutadiene, polyisobutylene, polyisoprene, atactic polypropylene and ethylene-propylene elastomers, ethylene-propylene-diene (EPDM), styrene-butadiene rubbers, nitrile rubbers, hydrogenated nitrile rubbers, halogenated rubbers, fluoroelastomers (e.g. Viton™), polyether block amides, ethylene vinyl acetate (EVA), epichlorohydrin rubber, acrylic rubbers, perfluoroelastomers (e.g. Kalrez™), polystyrene, polyacrylates, and polyurethane rubber. Without wishing to be bound by theory, it is thought that glassy organic polymers, which have Tg>+25° C. have less free volume than lower Tg materials, and the free volume allows more sorption into the bulk of the elastomer than a material with a higher Tg. The elastomer used herein may have a tan delta >0, alternatively >0 to 2. Tan delta means ratio of elastic loss modulus to elastic storage modulus.

When the nonporous crosslinked elastomer having a Tg≤25° C. is a nonporous crosslinked polyorganosiloxane elastomer having a Tg≤25° C., said nonporous crosslinked polyorganosiloxane elastomer can be prepared by a method comprising:

i) combining ingredients to prepare a composition comprising (A) a hydrosilylation catalyst, (B) a polyorganosiloxane having an average, per molecule, of two or more silicon bonded aliphatically unsaturated hydrocarbon groups, (C) a crosslinker having an average, per molecule, of more than two silicon bonded hydrogen atoms, optionally (D) an inhibitor, and optionally (E) a solvent; and ii) heating the composition, thereby forming the crosslinked polyorganosiloxane elastomer. Without wishing to be bound by theory, the Tg may be controlled by proper selection of ingredient (B), degree of polymerization (DP) and molecular weight of ingredient (B) and crosslink density. When ingredient (B), is a polydimethylsiloxane, DP may be 10 or higher to form a nonporous crosslinked elastomer having a Tg≤25° C. One skilled in the art would know how to select ingredients (A) and (B) to form a nonporous crosslinked elastomer having a Tg≤25° C.

Hydrosilylation catalysts suitable for ingredient (A) are known in the art and are commercially available. Such hydrosilylation catalysts can comprise a metal selected from platinum, rhodium, ruthenium, palladium, osmium, and iridium. Alternatively, the hydrosilylation catalyst may be a compound of such a metal, for example, chloroplatinic acid, chloroplatinic acid hexahydrate, platinum dichloride, and complexes of said compounds with low molecular weight organopolysiloxanes or platinum compounds microencapsulated in a matrix or core/shell type structure. Complexes of platinum with low molecular weight organopolysiloxanes include 1,3-diethenyl-1,1,3,3-tetramethyldisiloxane complexes with platinum. These complexes may be microencapsulated in a resin matrix. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. Nos. 4,766,176 and 5,017,654.

Ingredient (B) is a polyorganosiloxane having an average, per molecule, of two or more silicon bonded aliphatically unsaturated hydrocarbon groups capable of undergoing hydrosilylation reaction. Ingredient (B) may have a linear and/or branched structure. Ingredient (B) may be a homopolymer or a copolymer. Ingredient (B) may be one polyorganosiloxane. Alternatively, ingredient (B) may comprise two or more polyorganosiloxanes differing in at least one of the following properties: structure, viscosity, average molecular weight, siloxane units, and sequence. The aliphatically unsaturated hydrocarbon groups in Ingredient (B) may be located at terminal, pendant, or both terminal and pendant positions. The aliphatically unsaturated hydrocarbon groups may be alkenyl groups such as vinyl, allyl, propenyl, or hexenyl; or alkenyl groups such as ethynyl and propynyl.

The remaining silicon-bonded organic groups in the polyorganosiloxane for ingredient (B) may be monovalent organic groups free of aliphatic unsaturation. Examples of monovalent hydrocarbon groups include, but are not limited to, the alkyl, cycloalkyl, aryl, aralkyl, and carbocyclic groups described as above for $R^1$. Examples of monovalent halogenated hydrocarbon groups include the haloalkyl group and halogenated cycloalkyl groups described above for $R^1$. Examples of other monovalent organic groups are as defined above and include, but are not limited to, hydrocarbon groups substituted with oxygen atoms such as glycidoxyalkyl, acryloxyalkyl, methacryloxyalkyl, and alkoxy or polyether groups (ethylene glycols and propylene glycols and copolymers thereof), and hydrocarbon groups substituted with nitrogen atoms such as aminoalkyl and cyanofunctional groups such as cyanoethyl and cyanopropyl.

Ingredient (B) may comprise a polydiorganosiloxane of $$R^7{}_2R^8SiO(R^7{}_2SiO)_a(R^7R^8SiO)_bSiR^7{}_2R^8, \quad \text{Formula (I):}$$

$$R^7{}_3SiO(R^7{}_2SiO)_c(R^7R^8SiO)_dSiR^7{}_3, \quad \text{Formula (II):}$$

or a combination thereof.

In formulae (I) and (II), each $R^7$ is independently a hydrogen atom or a monovalent organic group free of aliphatic unsaturation and each $R^8$ is independently or alkenyl group or an alkynyl group. Subscript a may be 0 or a positive number. Alternatively, subscript a has an average value of at least 2. Alternatively subscript a may have a value ranging from 2 to 2000. Subscript b may be 0 or a positive number. Alternatively, subscript b may have an average value ranging from 0 to 2000. A quantity (a+b) may be at least 10, alternatively 100 to 4000. Subscript c may be 0 or a positive number. Alternatively, subscript c may have an average value ranging from 0 to 2000. Subscript d has an average value of at least 2. Alternatively subscript d may have an average value ranging from 2 to 2000. A quantity c+d may be at least 10, alternatively 100 to 4000. Suitable monovalent organic groups for $R^7$ are monovalent hydrocarbon groups and monovalent halogenated hydrocarbon groups as described above. Alternatively, each $R^7$ is a monovalent hydrocarbon group exemplified by alkyl such as methyl and aryl such as phenyl. Each $R^8$ is independently an alkenyl group or an alkynyl group. $R^8$ is exemplified by alkenyl groups such as vinyl, allyl, butenyl, and hexenyl; and alkynyl groups such as ethynyl and propynyl.

Ingredient (B) may comprise a polydiorganosiloxane such as
i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylvinylsiloxane),
vii) dimethylvinylsiloxy-terminated poly(dimethylsiloxane/methylphenylsiloxane),
viii) dimethylvinylsiloxy-terminated poly(dimethylsiloxane/diphenylsiloxane),
ix) phenyl,methyl,vinyl-siloxy-terminated polydimethylsiloxane,
x) dimethylhexenylsiloxy-terminated polydimethylsiloxane,
xi) dimethylhexenylsiloxy-terminated poly(dimethylsiloxane/methylhexenylsiloxane),
xii) dimethylhexenylsiloxy-terminated polymethylhexenylsiloxane,
xiii) trimethylsiloxy-terminated poly(dimethylsiloxane/methylhexenylsiloxane),
xiv) trimethylsiloxy-terminated polymethylhexenylsiloxane
xv) dimethylhexenyl-siloxy terminated poly(dimethylsiloxane/methylhexenylsiloxane),
xvi) dimethylvinylsiloxy-terminated poly(dimethylsiloxane/methylhexenylsiloxane)
xvii) a combination of two or more of i), ii), iii), iv), v), vi), vii), viii), ix), x), xi), xii), xiii), xiv), xv), and xvi).

Methods of preparing polydiorganosiloxane fluids suitable for use as ingredient (B), such as hydrolysis and condensation of the corresponding organohalosilanes or equilibration of cyclic polydiorganosiloxanes, are known in the art.

The amount of ingredient (B) in the composition depends on various factors including the quantity and hydrosilylation reactivity of the aliphatically unsaturated groups of ingredient (B), the type and amount of ingredient (A), and the content of silicon bonded hydrogen atoms of, ingredient (B) and/or ingredient (C). However, the amount of ingredient (B) may range from 0.1% to 99.9% based on the weight of all ingredients in the composition.

Ingredient (C) in the composition is a SiH functional compound, i.e., a compound having an average, per molecule, of more than two silicon bonded hydrogen atoms. Ingredient (C) may comprise a silane and/or an organohydrogensilicon compound. The amount of ingredient (C) in the composition depends on various factors including the SiH content of ingredient (C), and the content of aliphatically unsaturated groups of ingredient (B), however, the amount of ingredient (C) may be sufficient to provide a molar ratio of SiH groups in ingredient (C) to aliphatically unsaturated organic groups in ingredient (B) (commonly referred to as the SiH:Vi ratio) ranging from 0.3:1 to 5:1, alternatively 0.1:10 to 10:1. Ingredient (C) can have a monomeric or polymeric structure. When ingredient (C) has a polymeric structure, the polymeric structure may be linear or branched. When ingredient (C) is polymeric, then ingredient (C) can be a homopolymer or a copolymer. The silicon-bonded hydrogen atoms in ingredient (C) can be located at terminal, pendant, or at both terminal and pendant positions. Ingredient (C) may be one SiH functional compound. Alternatively, ingredient (C) may comprise a combination of two or more SiH functional compounds. Ingredient (C) may be two or more organohydrogenpolysiloxanes that differ in at least one of the following properties: structure, average molecular weight, viscosity, siloxane units, and sequence.

Ingredient (C) may comprise a silane of formula $R^9_e SiH_f$, where subscript e is 0, 1, 2, or 3; subscript f is 1, 2, 3, or 4, with the proviso that a sum of (e+f) is 4. Each $R^9$ is independently a halogen atom or a monovalent organic group. Suitable halogen atoms for $R^9$ are exemplified by chlorine, fluorine, bromine, and iodine; alternatively chlorine. Suitable monovalent organic groups for $R^9$ include, but are not limited to, the monovalent hydrocarbon and the monovalent halogenated hydrocarbon groups described above. \Examples of suitable silanes for ingredient (C) are exemplified by trichlorosilane ($HSiCl_3$), $Me_2HSiCl$, or $MeHSi(OMe)_2$.

Alternatively, the organohydrogensilicon compound of ingredient (C) may comprise a polyorganohydrogensiloxane comprising siloxane units including, but not limited to, $HR^{10}_2SiO_{1/2}$, $R^{10}_3SiO_{1/2}$, $HR^{10}SiO_{2/2}$, $R^{10}_2SiO_{2/2}$, $R^{10}SiO_{3/2}$, $HSiO_{3/2}$ and $SiO_{4/2}$ units. In the preceding formulae, each $R^{10}$ is independently selected from the monovalent organic groups free of aliphatic unsaturation described above.

Ingredient (C) may comprise a polyorganohydrogensiloxane of

Formula (III):

Formula (IV):

a combination thereof.

In formulae (III) and (IV) above, subscript g has an average value ranging from 0 to 2000, subscript h has an average value ranging from 2 to 2000, subscript i has an average value ranging from 0 to 2000, and subscript j has an average value ranging from 0 to 2000. Each $R^{10}$ is independently a monovalent hydrocarbon group or a monovalent halogenated hydrocarbon group, as described above.

Polyorganohydrogensiloxanes for ingredient (C) are exemplified by:
a) dimethylhydrogensiloxy-terminated polydimethylsiloxane,
b) dimethylhydrogensiloxy-terminated poly(dimethylsiloxane/methylhydrogensiloxane),
c) dimethylhydrogensiloxy-terminated polymethylhydrogensiloxane,
d) trimethylsiloxy-terminated poly(dimethylsiloxane/methylhydrogensiloxane),
e) trimethylsiloxy-terminated polymethylhydrogensiloxane,
f) a combination of two or more of a), b), c), d) and e).

Methods of preparing linear and branched organohydrogenpolysiloxanes suitable for use as ingredient (C), such as hydrolysis and condensation of organohalosilanes, are known in the art.

Ingredient (D) is an inhibitor that may be used for altering the reaction rate of the composition, as compared to a composition containing the same ingredients but with the inhibitor omitted. Inhibitors for hydrosilylation curable compositions are exemplified by acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-diemthyl-1-hexyn-3-ol, and 1-ethynyl-1-cyclohexanol, and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne; triazoles such as benzotriazole; phosphines; mercaptans; hydrazines; amines, such as tetramethyl ethylenediamine, dialkyl fumarates, dialkenyl fumarates, dialkoxyalkyl fumarates, maleates such as diallyl maleate; nitriles; ethers; carbon monoxide; alkenes such as cyclooctadiene, divinyltetramethyldisiloxane; alcohols such as benzyl alcohol; and a combination thereof.

Alternatively, ingredient (D) in the composition may be a silylated acetylenic compound. Without wishing to be bound by theory, it is thought that adding a silylated acetylenic compound reduces yellowing of the reaction product prepared from hydrosilylation reaction of the composition as compared to a reaction product from hydrosilylation of a composition that does not contain a silylated acetylenic compound or that contains an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, ingredient (D) is exemplified by methyl(tris(1,1-dimethyl-2-propynyloxy))silane, ((1,1-dimethyl-2-propynyl)oxy)trimethylsilane, or a combination thereof. The silylated acetylenic compound useful as ingredient (D) may be prepared by methods known in the art, such as silylating an acetylenic alcohol described above by reacting it with a chlorosilane in the presence of an acid receptor.

The amount of inhibitor added to the composition will depend on various factors including the desired pot life of the composition, whether the composition will be a one part composition or a multiple part composition, the particular inhibitor used, and the selection and amount of ingredient (C), if present. However, when present, the amount of inhibitor may range from 0% to 1%, alternatively 0% to 5%, alternatively 0.001% to 1%, alternatively 0.01% to 0.5%, and alternatively 0.0025% to 0.025%, based on the weight of all ingredients in the composition.

The composition can be prepared by a method comprising combining all ingredients by any convenient means such as mixing at ambient or elevated temperature. Ingredient (D), when present, may be added before ingredient (A), for example, when the composition will be prepared at elevated temperature and/or the composition will be prepared as a one part composition.

Alternatively, the composition may be prepared as a multiple part composition, for example, when ingredient (I) is absent, or when the composition will be stored for a long period of time before use. In the multiple part composition, ingredient (A) is stored in a separate part from any ingredient having a silicon bonded hydrogen atom, for example ingredient (C), and the parts are combined shortly before use of the composition. For example, a two part composition may be prepared by combining ingredients comprising (A) and (B) by any convenient means such as mixing. A curing agent may be prepared by combining ingredients comprising (B) and (C) by any convenient means such as mixing. The ingredients may be combined at ambient or elevated temperature. When a two part composition is used, the weight ratio of amounts of base to curing agent may range from 1:1 to 10:1. The composition will react via hydrosilylation reaction to form a reaction product.

Heating the composition may be performed at a temperature of 30° C. to 100° C., alternatively 50° C. to 85° C. for a time sufficient to form the crosslinked polyorganosiloxane elastomer. The ingredients, amounts thereof, and conditions for heating are selected such that the crosslinked polyorganosiloxane elastomer produced is a solid under conditions of 1 atmosphere and 25° C. The crosslinked polyorganosiloxane has a glass transition temperature (Tg) of less than 25° C. The composition described above may be free of fillers and ingredients other than those described above as ingredients (A), (B), (C) and (D). The elastomer may be prepared (crosslinked) in the presence of the solvent (E) and then dried. Alternatively, the nonporous crosslinked elastomer having a Tg≤25° C. may be made by other crosslinking scheme, such as by radical cure, condensation cure, photocure, and epoxy-amine cure.

Without wishing to be bound by theory, it is thought that the nonporous crosslinked elastomer may be selected for use in the method depending on various factors including volatile component to be removed and the depleted mixture to be formed. For example, when the volatile component is water, the nonporous crosslinked elastomer may be a polyorganosiloxane elastomer containing polyoxyalkylene groups. When the volatile component is a cyclic polyorganosiloxane, the nonporous crosslinked elastomer may be a polyorganosiloxane elastomer having alkyl groups.

System/Apparatus

Figure 1:
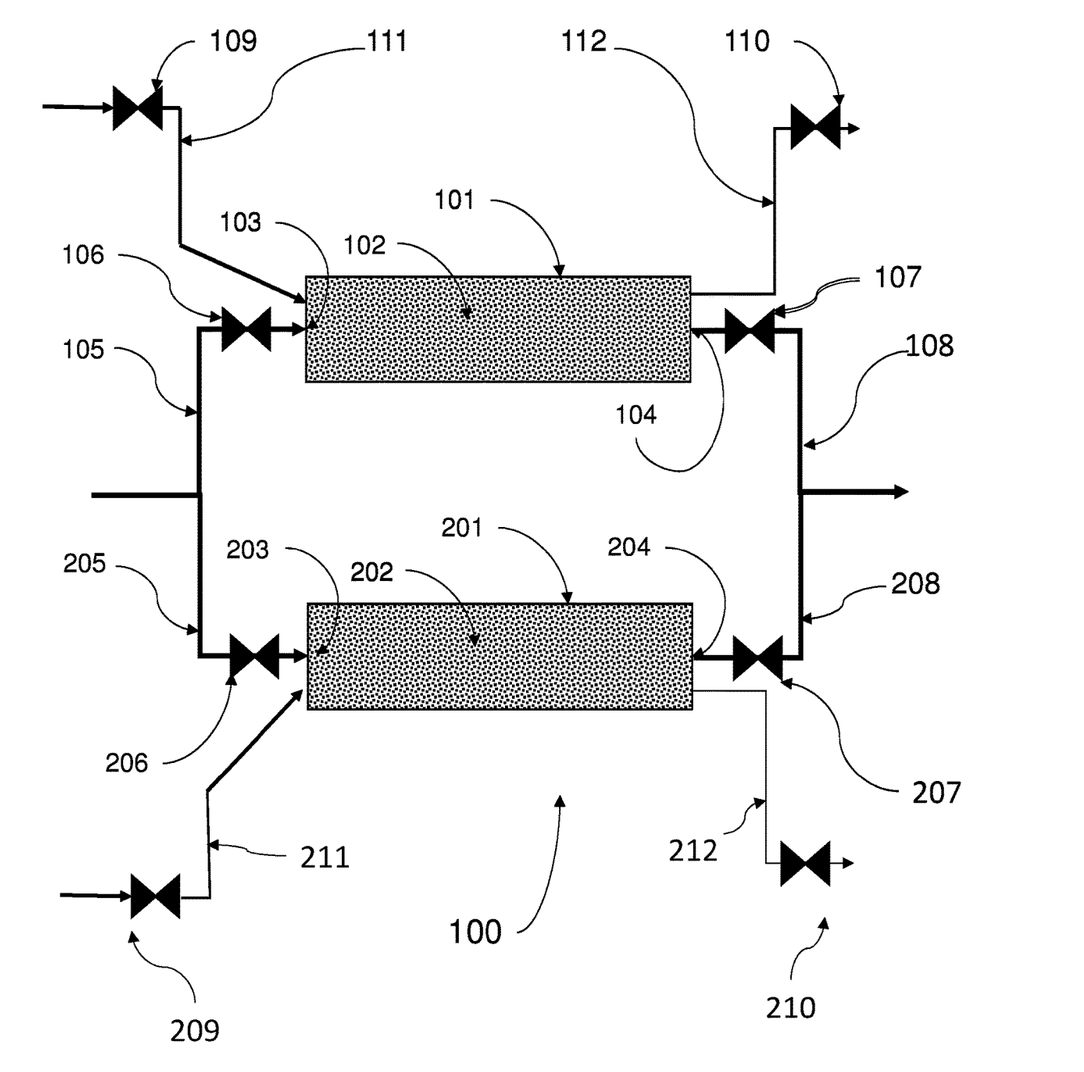
FIG. 1 is an example of an apparatus that can be used for practicing the method described herein.

FIG. 1 is an example of an apparatus 100 that can be used in practicing the method of this invention. A first contactor 101 contains a first packed bed of particles 102 of a nonporous crosslinked elastomer with a glass transition temperature ≤25° C. The first contactor 101 has a first inlet 103 and a first outlet 104. Feed line 105 can be used to feed the mixture described above into the first contactor 101 through inlet valve 106 into the first inlet 103. As the mixture passes through the first contactor 101, the volatile component is sorbed into the particles 102. The depleted mixture exits the first contactor 101 through the first outlet 104, through outlet valve 107 and out through outlet line 108. The depleted mixture is a purified product that may be stored in a collection container, not shown.

The apparatus 100 may further comprise a second contactor 201 containing a second packed bed of particles 202 of a nonporous crosslinked elastomer with a glass transition temperature ≤25° C. The particles 202 may be the same as, or different from, the particles 102 in the first contactor 101. The second contactor 201 has a second inlet 203 and a second outlet 204. When desired, such as when the particles 102 in the first packed bed swell as they sorb the volatile component causing an undesirable increase in pressure drop through the packed bed, and/or the rate at which the particles 102 can sorb the volatile component slows to an undesired rate as the particles sorb more of the volatile component, valves 106 and 107 may be shut and feed valve 206 and outlet valve 207 may be opened. This will re-route the mixture to flow through feed line 205 into the second contactor 201 through inlet valve 206 into the second inlet 203. As the mixture passes through the second contactor 201, the volatile component is sorbed into the particles 202. The depleted mixture exits the second contactor 201 through the second outlet 204, through outlet valve 207 and out through outlet line 208. The depleted mixture is a purified product that may be stored in the same or different collection container, not shown.

After the mixture stops flowing through the first contactor 101, the particles 102 in the contactor 101 may be regenerated. For example, purge valves 109, 110 can be opened and a sweep gas (such as air or an inert gas) passed through the first contactor 101 through lines 111, 112. The first contactor 101 may optionally be heated, and/or the sweep gas may optionally be heated. After the particles 102 in the first contactor 101 are regenerated, the valves 206, 207 may be closed and the mixture re-routed through the first contactor 101 again. The particles 202 may be regenerated similarly as in the first contactor 101 through valves and lines, not shown. The method may be repeated using the apparatus 100. The particles 202 in the second contactor 201 may be regenerated by opening purge valves 209, 210 can be opened and a sweep gas (such as air or an inert gas) passed through the second contactor 201 through lines 211, 212. The second contactor 201 may optionally be heated, and/or the sweep gas may optionally be heated.

FIG. 1 is included to demonstrate the invention to those of ordinary skill in the art. However, those of skill in the art should, in light of the present disclosure, appreciate that many changes can be made in the specific embodiments which are disclosed and still obtain a like or similar result without departing from the spirit and scope of the invention set forth in the claims. For example, the nonporous crosslinked elastomer with a glass transition temperature ≤25° C. may have various forms, in addition to or instead of particles 102, 202, for example, said elastomer may be in the form of thin films, coated support materials (e.g., packing, trays, plates, mesh), nanorods, particulates, and/or fibers (hollow and not hollow). The contactors 101, 201 may be vertically oriented or horizontally oriented as shown. The contactor 101, 201 may be a packed bed, fluidized bed, a tower containing plates, trays or disks coated with the nonporous crosslinked elastomer with a glass transition temperature ≤25° C. Alternatively, the contactor 101, 201 may be a sorbent wheel, such as a desiccant wheel, or other rotating disc or wheel apparatus wherein the nonporous crosslinked elastomer with a glass transition temperature 25° C. is coated on all or a portion of the surface of the wheel. Alternatively, additional contactors (not shown) may be configured in parallel or in series configuration with the contactors 101, 201. Optionally, when the contactor is a sorbent wheel or disc, the wheel may rotate through a sector or zone in which regeneration occurs, allowing continuous sorption and regeneration in a single device.

EXAMPLES

These examples are intended to illustrate some embodiments of the invention and should not be interpreted as limiting the scope of the invention set forth in the claims. The following ingredients were used in the examples.

Comparative Example 1: $D_4$ Vapor Sorption in a Non-Volatile Silicone Fluid 30 milligrams (mg) of a non-volatile Silicone Fluid 1 (DOW CORNING® 50 cSt 200 Fluid) was loaded onto a microbalance in a vapor sorption analyzer instrument (TA Instruments VTI-SA+) and exposed to $D_4$ vapor at various partial pressures relative to saturation at a given temperature. Silicone Fluid 1 is non-volatile. The reservoir of the organic vapor cell on the vapor sorption analyzer was filled with octamethylcyclotetrasiloxane ($D_4$, available from Dow Corning Corporation of Midland, Mich., USA). At each combination of temperature and relative pressure, the silicone fluid/$D_4$ vapor system reached thermodynamic equilibrium and the final mass of silicone fluid and sorbed $D_4$ vapor was recorded. Before each isotherm, the Silicone Fluid 1 was subjected to 2 hours of drying at 60° C. to ensure that any incidentally sorbed mass was removed and to establish the initial 'dry' mass. At each combination of temperature and pressure the equilibrium sorption capacity of Silicone Fluid 1 was recorded in units of mg of $D_4$ vapor sorbed per gram (g) of Silicone Fluid 1 (mg/g). The sorption capacities for Silicone Fluid 1 are included in Table 1.

Comparative Example 2: $D_4$ Vapor Sorption in a Porous Solid Sorbent 12 mg of granular activated carbon (Darco 20-40 activated charcoal mesh particle size, Sigma-Aldrich) was loaded onto a microbalance in a vapor sorption analyzer instrument (TA Instruments VTI-SA+) and exposed to $D_4$ vapor at various partial pressures relative to saturation at 20° C. In a second experiment, the reservoir of the organic vapor cell on the vapor sorption analyzer was filled with $D_4$. At each combination of temperature and relative pressure, the activated carbon/$D_4$ vapor system reached thermodynamic equilibrium and the final mass of activated carbon and sorbed $D_4$ vapor was recorded. Before each isotherm, the activated carbon was subjected to 2 hours of drying at 60° C. to ensure that any incidentally sorbed mass was removed and to establish the initial 'dry' mass. At each combination of temperature and pressure the equilibrium sorption capacity of activated carbon was recorded in units of mg of $D_4$ vapor sorbed per g of activated carbon (mg/g). The sorption capacities for activated carbon are included in Table 1.

Example 1: Crosslinked Polyorganosiloxane Elastomer 1

A crosslinked polyorganosiloxane elastomer was prepared by mixing a 2-part composition comprising Part A and Part B. Part A was prepared by mixing 99.61 parts of an α,ω-dimethylvinylsiloxy-terminated polydimethylsiloxane having viscosity of 55 Pa·s at 25° C. (Vi-PDMS 1) with 0.39 parts of Karstedt's Pt catalyst dispersion to provide an overall Pt concentration of 10 ppm by weight when combining equal amounts of parts A and B. Part B was prepared by combining 98.54 parts of Vi-PDMS1 with 1.26 parts of polydimethylsiloxane-polyhydridomethylsiloxane copolymer having an average viscosity of 0.03 Pa·s at 25° C. and including 1% H in the form of SiH (Crosslinker 1) and 0.20 parts of methylbutynol. Parts A and B were each independently mixed for two 20 second (s) cycles on a rotary mixer at 3000 rpm. 5.06 g of Part A and 5.06 g of Part B were then combined, mixed for two 20 s mixing cycles, then placed in a vacuum chamber to de-air for 2 minutes in vacuo, before moving the mixture to a forced air convection oven to cure for 3 hours at 85° C. The resulting sample was a clear, dry, non-flowable elastomer, referred to subsequently as Crosslinked Polyorganosiloxane Elastomer 1.

Example 2: Crosslinked Polyorganosiloxane Elastomer 2

A swollen crosslinked polyorganosiloxane elastomer was prepare by mixing a 2-part composition comprising Part A and Part B in the presence of an excess of a good solvent, decamethylcyclopentasiloxane ($D_5$). Part A was prepared by mixing in a polypropylene mixing cup 99.61 parts of Vi-PDMS 1 with 0.39 parts of Karstedt's Pt catalyst dispersion to provide an overall Pt concentration of 10 ppm when combining equal amounts of parts A and B. Part B was prepared by combining 98.54 parts of Vi-PDMS1 with 1.26 parts of Crosslinker 1. Parts A and B were each independently mixed for two 20 s cycles on a Hauschild rotary mixer at approximately 3000 rpm. 0.625 g of Part A was combined with 4.375 g of $D_5$ and mixed for two 20 s mixing cycles. 0.625 g of Part B was combined with 4.375 g of $D_5$ and mixed for two 20 s mixing cycles. Finally, 4.42 g of the $D_5$ containing Part A and 4.42 g of the $D_5$ containing Part B were combined and mixed for two 20 mixing cycles. The sample was then moved to a forced air convection oven to cure for 3 hours at 85° C. The resulting swollen crosslinked polyorganosiloxane elastomer was then placed in a vacuum oven at 150° C. for 24 h under a reduced pressure of 1 inch of Hg. The resulting regenerated elastomer was then re-weighed and confirmed to be completely devoid of residual $D_5$, leaving a regenerated elastomer, referred to subsequently as Crosslinked Polyorganosiloxane Elastomer 2. The resulting sample was a clear, dry, non-flowable solid. This example demonstrated that the elastomer could be regenerated using the method described herein.

Example 3: $D_4$ Vapor Sorption in Crosslinked Polyorganosiloxane Elastomer 1

A 2 mg piece of Crosslinked Polyorganosiloxane Elastomer 1 cut from the sample described in Example 1 was loaded onto a microbalance in a vapor sorption analyzer instrument (TA Instruments VTI-SA+) and exposed to $D_4$ vapor at various partial pressures relative to saturation at a given temperature. The reservoir of the organic vapor cell on the vapor sorption analyzer was filled with octamethylcyclotetrasiloxane ($D_4$). At each combination of temperature and relative pressure, the crosslinked polyorganosiloxane elastomer/$D_4$ vapor system reached thermodynamic equilibrium and the final mass of crosslinked polyorganosiloxane elastomer and sorbed $D_4$ vapor was recorded. Before each isotherm, the crosslinked polyorganosiloxane elastomer was subjected to 2 hours of drying at 60° C. to ensure that any incidentally sorbed mass was removed and to establish the initial 'dry' mass. At each combination of temperature and pressure the equilibrium sorption capacity of the sorbent was recorded in units of mg of $D_4$ vapor sorbed per g of crosslinked polyorganosiloxane elastomer per atmosphere of (mg/g). The sorption capacities for Crosslinked Polyorganosiloxane Elastomer 1 are included in Table 1. Although at high relative pressures, equilibration profiles takes over 1000 minutes, upon desorbing from a high relative pressure 0.8 to 0.02 relative $D_4$ pressure at 40° C., the samples exhibited a steep, monotonic decline in sorbed $D_4$ over a much shorter period of time, thus demonstrating ease of desorption under the conditions tested in this example, indicating suitability for use in the method described herein.

Example 4: $D_4$ Vapor Sorption in Crosslinked Polyorganosiloxane Elastomer 2

A 34 mg piece of Crosslinked Polyorganosiloxane Elastomer 2 cut from the cured sample described in Example 2 was loaded onto a microbalance in a vapor sorption analyzer instrument (TA Instruments VTI-SA+) and exposed to $D_4$ vapor at various partial pressures relative to saturation at a given temperature. The reservoir of the organic vapor cell on the vapor sorption analyzer was filled with $D_4$. At each combination of temperature and relative pressure, the crosslinked polyorganosiloxane elastomer/$D_4$ vapor system reached thermodynamic equilibrium and the final mass of crosslinked polyorganosiloxane elastomer and sorbed $D_4$ vapor was recorded. Before each isotherm, the Crosslinked Polyorganosiloxane Elastomer 2 sample was subjected to 2 hours of drying at 60° C. to ensure that any incidentally sorbed mass was removed and to establish the initial 'dry' mass. At each combination of temperature and pressure the equilibrium sorption capacity of the Crosslinked Polyorganosiloxane Elastomer 2 was recorded in units of mg of $D_4$ vapor sorbed per g of Crosslinked Polyorganosiloxane Elastomer 2 per atmosphere of (mg/g). The sorption capacities for Crosslinked Polyorganosiloxane Elastomer 2 are included in Table 1. Although at high relative pressures, equilibration profiles takes over 1000 minutes, upon desorbing from a high relative pressure 0.8 to 0.02 relative $D_4$ pressure at 40° C., the samples exhibit a steep, monotonic decline in sorbed $D_4$ over a much shorter period of time, confirming their ease of desorption.

Example 5: Crosslinked Polyorganosiloxane Elastomer 3

A crosslinked polyorganosiloxane elastomer was prepared by mixing a 2-part composition comprising Part A and Part B. Part A was prepared by mixing 99.61 parts of an α,ω-dimethylvinylsiloxy-terminated polydimethylsiloxane having a viscosity of 12 Pa·s at 25° C. (Vi-PDMS 2) with 0.39 parts of Karstedt's Pt catalyst dispersion to provide an overall Pt concentration of 10 ppm when combining equal amounts of parts A and B. Part B was prepared by combining 91.74 parts of Vi-PDMS 2 with 8.15 parts of a trimethylsiloxy terminated copolymer of a polydimethylsiloxane-polyhydridomethylsiloxane copolymer having an average viscosity of 0.005 Pa·s at 25° C. and including 0.8 wt % H in the form of SiH (Crosslinker 2) and 0.10 parts of methylbutynol. Parts A and B were each independently mixed for two 20 second (s) cycles on a rotary mixer at 3000 rpm. 5.00 g of Part A and 5.01 g of Part B were then combined, mixed for two 20 s mixing cycles, then placed in a vacuum chamber to de-air for 2 minutes in vacuo, before moving the mixture to a forced air convection oven to cure for 3 hours at 85° C. The resulting sample was a clear, dry, non-flowable elastomer, subsequently referred to herein as Crosslinked Polyorganosiloxane Elastomer 3.

Example 6: Crosslinked Polyorganosiloxane Elastomer 4

A swollen crosslinked polyorganosiloxane elastomer was prepare by mixing a 2-part composition comprising Part A and Part B in the presence of an excess of a good solvent, decamethylcyclopentasiloxane ($D_5$). Part A was prepared by mixing in a polypropylene mixing cup 99.61 parts of Vi-PDMS 2 with 0.39 parts of Karstedt's Pt catalyst dispersion to provide an overall Pt concentration of 10 ppm when combining equal amounts of parts A and B. Part B was prepared by combining 91.47 parts of Vi-PDMS1 with 8.13 parts of Crosslinker 2. Parts A and B were each independently mixed for two 20 s cycles on a Hauschild rotary mixer at 3000 rpm. 0.624 g of Part A was combined with 4.377 g of $D_5$ and mixed for two 20 s mixing cycles. 0.622 g of Part B was combined with 4.376 g of $D_5$ and mixed for two 20 s mixing cycles. Finally, 4.95 g of the $D_5$ containing Part A and 4.95 g of the $D_5$ containing Part B were combined and mixed for two 20 mixing cycles. The sample formed a crosslinked soft gel within 1 hour at room temperature. The resulting swollen crosslinked polyorganosiloxane elastomer was then placed in a vacuum oven at 150° C. for 24 h under a reduced pressure of 1 inch of Hg. The resulting regenerated elastomer was then re-weighed and confirmed to be completely devoid of residual $D_5$, leaving a regenerated elastomer, referred to subsequently as Crosslinked Polyorganosiloxane Elastomer 4. The resulting sample was a clear, dry, non-flowable solid. This example demonstrated that the elastomer could be regenerated using the method described herein.

Example 7: $D_4$ Vapor Sorption in Crosslinked Polyorganosiloxane Elastomer 3

A 12 mg piece of Crosslinked Polyorganosiloxane Elastomer 3 cut from the sample described in Example 5 was loaded onto a microbalance in a vapor sorption analyzer instrument (TA Instruments VTI-SA+) and exposed to $D_4$ vapor at various partial pressures relative to saturation at a given temperature. The reservoir of the organic vapor cell on the vapor sorption analyzer was filled with octamethylcyclotetrasiloxane ($D_4$). At each combination of temperature and relative pressure, the crosslinked polyorganosiloxane elastomer/$D_4$ vapor system reached thermodynamic equilibrium and the final mass of crosslinked polyorganosiloxane elastomer and sorbed $D_4$ vapor was recorded. Before each isotherm, the crosslinked polyorganosiloxane elastomer was subjected to 2 hours of drying at 60° C. to ensure that any incidentally sorbed mass was removed and to establish the initial 'dry' mass. At each combination of temperature and pressure the equilibrium sorption capacity of the sorbent was recorded in units of mg of $D_4$ vapor sorbed per g of crosslinked polyorganosiloxane elastomer per atmosphere of (mg/g). The sorption capacities for crosslinked polyorganosiloxane elastomer 3 are included in Table 1. This sample shows sorption capacity to $D_4$ vapor at low relative pressures that is comparable to that of the uncrosslinked liquid (Comparative Example 1), demonstrating utility as a sorbent for $D_4$ vapor.

Example 8: $D_4$ Vapor Sorption in Crosslinked Polyorganosiloxane Elastomer 4

A 15 mg piece of Crosslinked Polyorganosiloxane Elastomer 4 cut from the sample described in Example 5 was loaded onto a microbalance in a vapor sorption analyzer instrument (TA Instruments VTI-SA+) and exposed to $D_4$ vapor at various partial pressures relative to saturation at a given temperature. The reservoir of the organic vapor cell on the vapor sorption analyzer was filled with octamethylcyclotetrasiloxane ($D_4$). At each combination of temperature and relative pressure, the crosslinked polyorganosiloxane elastomer/$D_4$ vapor system reached thermodynamic equilibrium and the final mass of crosslinked polyorganosiloxane elastomer and sorbed $D_4$ vapor was recorded. Before each isotherm, the crosslinked polyorganosiloxane elastomer was subjected to 2 hours of drying at 60° C. to ensure that any incidentally sorbed mass was removed and to establish the initial 'dry' mass. At each combination of temperature and pressure the equilibrium sorption capacity of the sorbent was recorded in units of mg of $D_4$ vapor sorbed per g of crosslinked polyorganosiloxane elastomer per atmosphere of (mg/g). The sorption capacities for Crosslinked Polyorganosiloxane Elastomer 4 are included in Table 1. This sample shows sorption capacity to $D_4$ vapor at low relative pressures that is comparable to that of the uncrosslinked liquid (Comparative Example 1), demonstrating utility as a sorbent for $D_4$ vapor.

TABLE 1

| Sample | Temperature (° C.) | Relative Pressure | Sorption Capacity (mg/g) |
|---|---|---|---|
| Comparative Example 1 | 20 | 0.02 | 1.76 |
| | 20 | 0.04 | 7.21 |
| | 30 | 0.02 | 3.09 |
| | 30 | 0.04 | 8.19 |
| | 40 | 0.02 | 3.85 |
| | 40 | 0.04 | 8.39 |
| | 40 | 0.2 | 68.3 |
| | 40 | 0.4 | 153 |
| | 40 | 0.6 | 369 |
| | 40 | 0.8 | 1140 |
| Comparative Example 2 | 20 | 0.02 | 137 |
| | 20 | 0.2 | 208 |
| | 20 | 0.5 | 247 |
| | 20 | 0.8 | 326 |
| | 40 | 0.1 | 213 |
| | 40 | 0.2 | 241 |
| | 40 | 0.5 | 286 |
| | 40 | 0.8 | 367 |
| Example 3 | 20 | 0.02 | 0.32 |
| | 20 | 0.04 | 4.96 |
| | 30 | 0.02 | 1.43 |
| | 30 | 0.04 | 6.29 |
| | 40 | 0.02 | 1.14 |
| | 40 | 0.04 | 6.71 |
| | 40 | 0.8 | 558 |
| Example 4 | 20 | 0.02 | 1.13 |
| | 20 | 0.04 | 6.06 |
| | 40 | 0.02 | 2.45 |
| | 40 | 0.95 | 1214 |
| | 40 | 0.9 | 926 |
| | 40 | 0.8 | 618 |
| | 40 | 0.6 | 329 |
| | 40 | 0.4 | 153 |
| | 40 | 0.2 | 42.5 |
| | 40 | 0.1 | 18.5 |
| Example 7 | 20 | 0.02 | 1.59 |
| | 20 | 0.04 | 5.10 |
| | 30 | 0.02 | 2.62 |
| | 30 | 0.04 | 6.93 |
| | 40 | 0.02 | 3.40 |
| | 40 | 0.04 | 8.00 |
| Example 8 | 20 | 0.02 | 1.91 |
| | 20 | 0.04 | 5.28 |
| | 30 | 0.02 | 2.54 |
| | 30 | 0.04 | 7.25 |
| | 40 | 0.02 | 2.87 |
| | 40 | 0.04 | 8.32 |

Comparative Example 3: Toluene Vapor Sorption in Non-Volatile Silicone Fluid 37 mg of a non-volatile Silicone Fluid 2 (DOW CORNING® 350 cSt 200 Fluid) was loaded onto a microbalance in a vapor sorption analyzer instrument (TA Instruments VTI-SA+) and exposed to toluene vapor at various partial pressures relative to saturation at a given temperature. Silicone Fluid 1 is non-volatile. The reservoir of the organic vapor cell on the vapor sorption analyzer was filled with toluene (certified ACS grade, Fisher Scientific). At each combination of temperature and relative pressure, the silicone fluid/toluene vapor system reached thermodynamic equilibrium and the final mass of silicone fluid and sorbed toluene vapor was recorded. Before each isotherm, the Silicone Fluid 2 was subjected to 2 hours of drying at 60° C. to ensure that any incidentally sorbed mass was removed and to establish the initial 'dry' mass. At each combination of temperature and pressure the equilibrium sorption capacity of Silicone Fluid 2 was recorded in units of mg of toluene vapor sorbed per g of Silicone Fluid 2 (mg/g). The sorption capacities for Silicone Fluid 2 are included in Table 2.

Example 9: Toluene Vapor Sorption in Crosslinked Polyorganosiloxane Elastomer 5

A 42 mg sample of Sylgarde® 184 Elastomer (Dow Corning Corp.) (Crosslinked Polyorganosiloxane Elastomer 5) that was cut from a block that had been cured at 85° C. for 3 hours after mixing in the prescribed 10:1 mix ratio of base to curing agent was loaded onto a microbalance in a vapor sorption analyzer instrument (TA Instruments VTI-SA+) and exposed to toluene vapor at various partial pressures relative to saturation at a given temperature. The reservoir of the organic vapor cell on the vapor sorption analyzer was filled with toluene (certified ACS grade, Fisher Scientific). At each combination of temperature and relative pressure, the crosslinked polyorganosiloxane elastomer/toluene vapor system reached thermodynamic equilibrium and the final mass of crosslinked polyorganosiloxane elastomer and sorbed toluene vapor was recorded. Before each isotherm, the crosslinked polyorganosiloxane elastomer was subjected to 3 hours of drying at 60° C. to ensure that any volatile species or incidentally sorbed mass was removed and to establish the initial 'dry' mass. At each combination of temperature and pressure the equilibrium sorption capacity of the sorbent was recorded in units of mg of toluene vapor sorbed per g of crosslinked polyorganosiloxane elastomer per atmosphere of (mg/g). The sorption capacities for Crosslinked Polyorganosiloxane Elastomer 5 are included in Table 2. This sample shows sorption capacity to $D_4$ vapor at low relative pressures that is comparable to that of an uncrosslinked Silicone Fluid 2 (Comparative Example 3), demonstrating utility as a sorbent for $D_4$ vapor.

TABLE 2

| | Relative Pressure Toluene | 20° C. | 30° C. | 40° C. |
|---|---|---|---|---|
| Example 9 | 0.2 | 35.0 | 36.7 | 37.5 |
| Toluene vapor sorbed | 0.4 | 81.8 | 85.4 | 85.9 |
| mg/g | 0.6 | 156.7 | 164.4 | 158.9 |
| | 0.8 | 334.2 | 319.6 | 286.9 |
| Comparative Example 3 | 0.2 | 41.8 | 42.9 | 44.4 |
| Toluene vapor sorbed | 0.4 | 101.4 | 109.3 | 103.6 |
| mg/g | 0.6 | 209.0 | 213.2 | 201.2 |
| | 0.8 | 463.4 | 412.1 | 394.6 |

These results demonstrate that even though the crosslinked polyorganosiloxane elastomers used in this invention are non-porous, non-flowable crosslinked solids, they retain unusually high sorption capacity for vapors that increases with temperatures and are readily desorbed upon exposure to lower relative pressures.

Comparative Example 4 Packed Bed with Activated Charcoal Adsorbent 125 standard cubic centimeters (sccm) of nitrogen gas containing octamethylcyclotetrasiloxane ($D_4$) vapor at a relative pressure of 0.49 and hexamethyldisiloxane ($L_2$) vapor at a relative pressure of 0.04 was introduced to a packed bed of Darco 20-40 mesh particle size, granular activated charcoal particles. The temperature of the combined gas/vapor stream at the entrance of the packed bed was 23° C. The inner diameter and length of the stainless steel tubing that housed the packed bed were 0.46 centimeters (cm) and 7.0 cm, respectively. The mass of activated charcoal comprising the packed bed was 472 milligrams (mg). The time-averaged packed bed entrance and exit pressures were 2.78 and 1.88 pounds per square inch gauge (psig), respectively. A 0.5 micrometer (μm) filter was placed at the packed bed exit to prevent particles from flowing downstream. The packed bed effluent $D_4$ vapor and $L_2$ vapor concentrations were measured as a function of time using gas/vapor automated injection to a gas chromatograph. From this data, packed bed capacities were calculated as 275 mg $D_4$ vapor per gram activated charcoal and 63 mg $L_2$ vapor per gram activated charcoal. The $D_4/L_2$ separation factor, defined as the relative ratios of the $D_4$ and $L_2$ mole fractions in the adsorbed and vapor phases, was 8.1.

Example 9 Packed Bed with Nonporous Crosslinked Polyorganosiloxane Elastomer Particles 125 sccm of nitrogen gas containing octamethylcyclotetrasiloxane ($D_4$) vapor at a relative pressure of 0.49 and hexamethyldisiloxane ($L_2$) vapor at a relative pressure of 0.04 was introduced to a packed bed of nonporous polyorganosiloxane elastomer particles. The temperature of the combined gas/vapor stream at the entrance of the packed bed was 23° C. The inner diameter and length of the stainless steel tubing that housed the packed bed were 0.46 cm and 7.0 cm, respectively. The mass of nonporous polyorganosiloxane elastomer particles comprising the packed bed was 304 mg. The time-averaged packed bed entrance and exit pressures were 3.10 and 1.88 psig, respectively. A 0.5 μm filter was placed at the packed bed exit to prevent particles from flowing downstream. The packed bed effluent $D_4$ vapor and $L_2$ vapor concentrations were measured as a function of time using gas/vapor automated injection to a gas chromatograph. From this data, packed bed capacities were calculated as 205 mg $D_4$ vapor per gram non-porous silicone elastomer particles and 24 mg $L_2$ vapor per gram non-porous silicone elastomer particles. The $D_4/L_2$ separation factor, defined as the relative ratios of the $D_4$ and $L_2$ mole fractions in the adsorbed and vapor phases, was 16.6. Comparative Example 4 and Example 9 show that the method described in Example 9 can selectively remove $D_4$ from $L_2$ better than a method using activated charcoal.

INDUSTRIAL APPLICABILITY

The method described herein is particularly useful for separating a gas or vapor (e.g. $D_4$, $D_5$) from a mixture by contacting the mixture (e.g. cyclics laden silicone fluid or a $D_4$-containing process gas stream) comprising at least one vapor phase volatile component with a sorbent comprising a nonporous crosslinked elastomer with a glass transition temperature ≤+25° C. Optionally, the elastomer may be crosslinked in the presence of a solvent which is then subsequently substantially removed. The resulting nonporous crosslinked elastomer exhibits an unusually high capacity to adsorb vapors such as $D_4$ and VOC's, with a unique and advantageous thermal profile that increases significantly in capacity at higher temperatures, as opposed to low temperature, and desorbs very readily at low temperatures. Due to the availability and sometimes necessity to separate volatiles from streams that are already warm without heat loss from contacting a cold sorbent material, as well as the energy and cost savings of being able to use unheated air and/or inert gas streams to regenerate the sorbent, the method described herein employing a nonporous crosslinked elastomer has significant potential consequences for energy and cost-efficiency gains in traditional gas separations. Also disclosed are contacting devices that comprise such media and products purified by such contacting processes, including silicone products and intermediates. Compared to conventional solid adsorbent media or porous organic, polymeric or organometallic structures, the nonporous crosslinked polyorganosiloxane elastomers may be less prone to fouling and mass transfer limitations.

Definitions and Usage of Terms

All amounts, ratios, and percentages are by weight unless otherwise indicated. The articles 'a', 'an', and 'the' each refer to one or more, unless otherwise indicated by the context of the specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an aryl group, or an aralkyl group includes the member alkyl individually; the subgroup alkyl and aryl; and any other individual member and subgroup subsumed therein.

Abbreviations used herein are defined as follows. The abbreviation "cSt" means centiStokes. "DP" means the degree of polymerization. "GC" means gas chromatography. "Pa·s" means Pascal seconds, and "ppm" means parts per million. "Tg" means glass transition temperature.

The term "depleted" and its derivatives each mean that the amount of volatile component in the mixture before step 1) is reduced to a lower amount after practicing step 1) of the method described herein.

The term "enriched" and its derivatives mean that the amount of volatile component in the crosslinked elastomer is greater during and after practicing step 1) than before practicing step 1) of the method described herein.

The term "non-porous" and its derivatives, as used herein with regard to the crosslinked elastomer means said elastomer has substantially no pores (i.e. holes, slits, void volumes of any shape) that have diameter (or average cross section-spanning dimension in the case of irregularly shaped pores) of less than 100 micrometer (um). It should be noted that while any given contiguous piece of said elastomer is intrinsically non-porous, said elastomer may comprise particles, fibers or sheets of any size and shape such that the spaces between contiguous particles, fibers or sheets may create significant surface area. Pieces of said elastomer may contain cavities, which are differentiated from pores, by having a diameter (or average cross section-spanning dimension in the case of irregularly shaped pores) of at least 100 um, such as larger holes or cavities which are molded, drilled, cut or otherwise formed within a contiguous elastomer piece to maximize fluid flow while minimizing fluid pressure. The term non-porous includes semi-permeable materials where the volatile component is sorbed but smaller molecules (e.g., nitrogen gas) can pass through.

The term "sorb" and its derivatives, means absorbing and/or adsorbing; alternatively adsorbing, and alternatively absorbing. Alternatively, sorb can include both absorbing and adsorbing.

The term "substituted" as used herein refers to a monovalent hydrocarbon group (e.g., alkyl, alkenyl, alkynyl, or aryl) in which one or more bonds to a hydrogen atom contained therein are replaced by one or more bonds to a non-hydrogen atom and/or one or more carbon atoms are replaced with a heteroatom (e.g., halogen, N, O, or S).

The term "volatile" and its derivatives, means that one component may have a higher vapor pressure than another component. In certain embodiments, the volatile component may be distinguished from the at least one other component in the mixture by virtue of relative vapor pressures. The volatile component may have a vapor pressure higher than the vapor pressure of the at least other component in the mixture. The volatile component may have a pure component vapor pressure of at least 0.1 mm Hg at 70° C. The at least one other component in the mixture may be a nonvolatile component that has a vapor pressure less than 0.1 mmHg at 70° C. (Volatility refers to the tendency of a substance to vaporize. Volatility is directly related to the vapor pressure of a substance. At a given temperature, a substance with a higher vapor pressure vaporizes more readily than a substance with a lower vapor pressure.) IN other embodiments, the volatile component may have a vapor pressure lower than vapor pressure of at least one other component in the mixture, when solubility of the volatile component is higher in the nonporous crosslinked elastomer than solubility of the at least one other component in the nonporous crosslinked elastomer.

The invention claimed is:

1. A method for depleting a volatile component in a mixture comprising the volatile component and at least one other component, the method comprising 1) sorbing at least some of the volatile component into bulk of a nonporous crosslinked polyorganosiloxane elastomer, thereby forming a depleted mixture containing less of the volatile component than the mixture before sorbing and enriching the nonporous crosslinked polyorganosiloxane elastomer with sorbed volatile component thereby forming an enriched crosslinked elastomer, wherein during step 1), at least some of the volatile component is in gas phase, 2) desorbing at least some of the sorbed volatile component from the enriched crosslinked elastomer, thereby forming a desorbed volatile component and a regenerated elastomer containing less of the sorbed volatile component than the enriched crosslinked elastomer prior to desorbing, and 3) using the regenerated elastomer as all or a portion of the nonporous crosslinked polyorganosiloxane elastomer in repeating step 1), and 4) directing one or both of the depleted mixture during and/or after step 1) and the desorbed volatile component during and/or after step 2); where the volatile component has a vapor pressure less than a vapor pressure of the at least one other component in the mixture and the volatile component is a cyclic polyorganosiloxane with a degree of polymerization from 3 to 12, a silane, or a noncyclic polyorganosiloxane with a degree of polymerization up to 14.

2. The method of claim 1, where the volatile component is a cyclic polyorganosiloxane with a degree of polymerization from 3 to 12.

3. The method of claim 1, where the at least one other component of the mixture comprises a non-volatile organic liquid or a non-volatile polyorganosiloxane liquid.

4. The method of claim 1, where the mixture is a process vapor stream and the depleted mixture is a depleted process vapor.

5. The method of claim 1, where the nonporous crosslinked polyorganosiloxane elastomer has a form selected from thin films, coated support materials, nanorods, particulates, and fibers.

6. The method of claim 1, wherein the nonporous crosslinked polyorganosiloxane elastomer is prepared by a method comprising:
   1) combining ingredients and crosslinking to form the nonporous crosslinked polyorganosiloxane elastomer in the presence of a solvent, and
   2) thereafter removing the solvent.

7. The method of claim 6, where the ingredients in step 1) comprise:
   (A) a hydrosilylation catalyst,
   (B) a polyorganosiloxane having an average, per molecule, of two or more silicon bonded aliphatically unsaturated hydrocarbon groups,
   (C) a crosslinker having an average, per molecule, of more than two silicon
   bonded hydrogen atoms,
   optionally (D) an inhibitor, and
   (E) the solvent; and
   step 2) is performed by heating the composition.

* * * * *